UNITED STATES PATENT OFFICE.

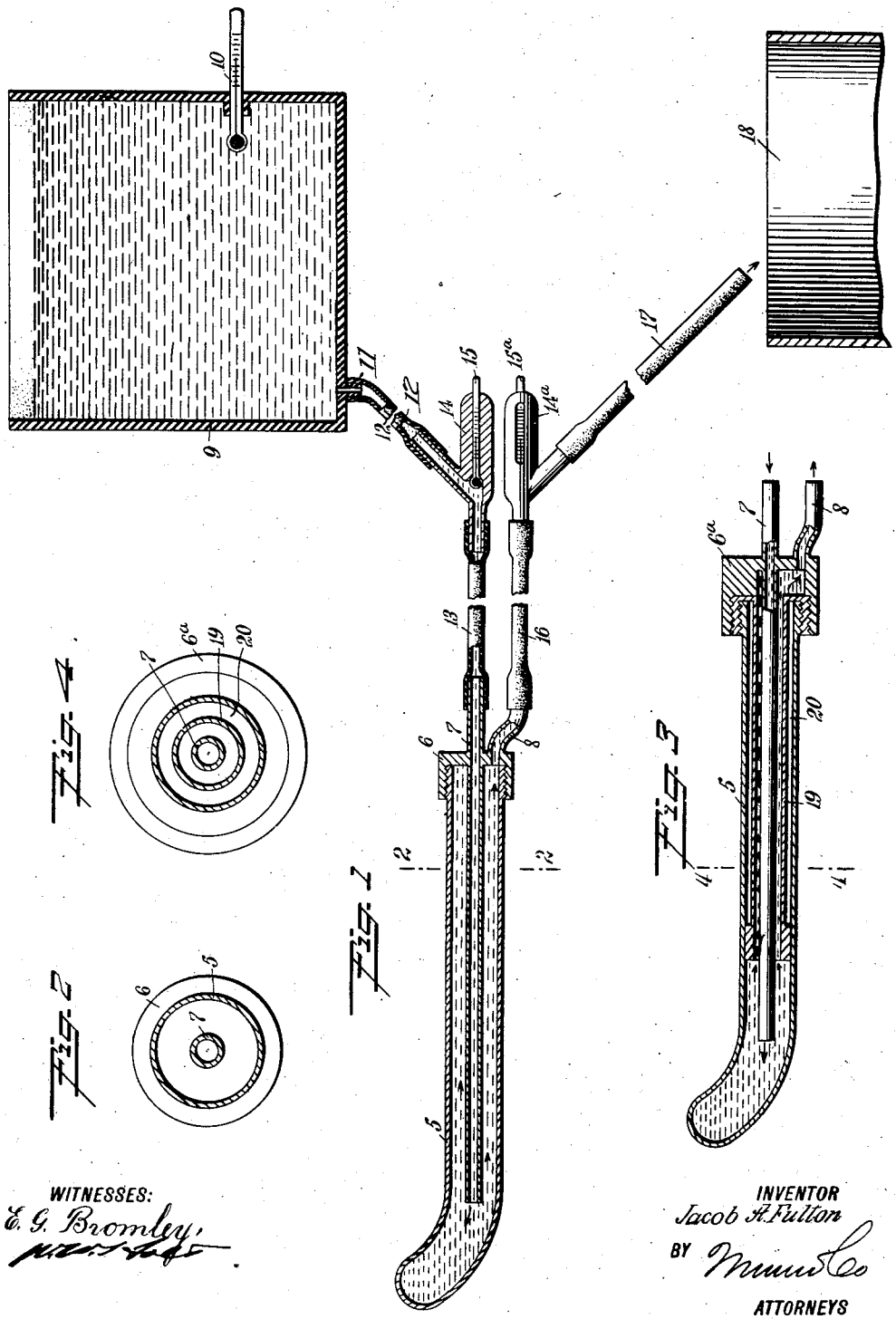

JACOB A. FULTON, OF ASTORIA, OREGON.

APPLIANCE FOR SUBJECTING PORTIONS OF THE HUMAN SYSTEM TO HEAT OR COLD.

1,011,606.  Specification of Letters Patent.  Patented Dec. 12, 1911.

Application filed March 5, 1910. Serial No. 547,578.

*To all whom it may concern:*

Be it known that I, JACOB A. FULTON, a citizen of the United States, and a resident of Astoria, in the county of Clatsop and State of Oregon, have invented a new and Improved Appliance for Subjecting Portions of the Human System to Heat or Cold, of which the following is a full, clear, and exact description.

The majority of diseases are caused by the entrance of pathogenic bacteria into the system. These bacteria have been studied and their life history has been demonstrated. They all thrive best at the temperature of the human body, and any variation either above or below that temperature interferes with their growth and vitality. Some of these bacteria are very hardy and it requires quite a high or low degree of temperature to destroy them, but any variation from the normal temperature of the human body interferes with their growth. Some of them are of low vitality and are destroyed at temperatures only a few degrees above or below that of the body, and the growth of all is retarded and their vitality weakened when subjected to a temperature removed from this, whether above or below.

The object of my invention is to make it possible to either absolutely destroy such bacteria as may be reached by an application of heat or cold at a temperature that will be destructive to them, or at least retard their development, the treatment being at a temperature which will not be destructive to the vitality of the tissues.

The instrument is devised so that the cooling or heating effect may be applied to the urethra, bladder, vagina, womb, rectum or throat.

Reference is to be had to the accompanying drawings forming a part of this specification, in which similar characters of reference indicate corresponding parts in all the views.

Figure 1 is a side view of an instrument constructed in accordance with my invention, partly in central vertical section; Fig. 2 is a cross-section of the instrument on the line 2—2 of Fig. 1; Fig. 3 is a longitudinal section through a modified form of the applicator or bougie; and Fig. 4 is a cross-section of the same on the line 4—4 of Fig. 3.

Referring more especially to Figs. 1 and 2, the instrument comprises a bougie or applicator 5 in the form of a relatively long hollow body of uniform diameter closed at its distal end, where it is ordinarily provided with a slight curve to conform to the passage of the organs in which it is inserted, and threaded at its proximal end to receive a screw-threaded cap 6, this cap having a feed tube 7 and a discharge tube 8, the tubes being suitably attached, with the feed tube arranged approximately centrally of the cap and extending to both sides thereof, the discharge end of the feed tube terminating near the distal end of the bougie or applicator. The discharge tube 8 extends to the outer side of the cap only.

By making the bougie or applicator 5 of uniform diameter throughout its length, whatever the length or whatever the diameter may be, I have provided an instrument which is especially adapted to be inserted in certain organs of the body wherein the tube or passage is substantially of uniform caliber throughout its length; such uniform diameter provides an instrument which is easy to work with and which is easily inserted in place, the forward end thereof being brought to the portion of the tube or passage to which the heat is to be applied.

A water tank 9, which is insulated or made of insulating material, has a thermometer 10 arranged to indicate the temperature of the water, and discharges at or near the bottom through a nipple or pipe 11. The water from the tank is led to the tube 11 of the bougie or applicator through lengths of rubber tubing 12 and 13 respectively, and a coupling 14 which is provided with a thermometer 15, the tube 12 extending from the discharge or nipple 11 of the tank to the inlet end of the coupling, and the tube 13 extending from the outlet end of the coupling to the inlet end of the feed tube 7. A similar coupling 14$^a$ having a thermometer 15$^a$ connects with the discharge tube 8 of the bougie or applicator, through a length of rubber tubing 16, and discharges through a length of rubber tubing 17 into any suitable receptacle 18. This construction of the appliance enables the temperature of the water in the tank, the water passing into the bougie or applicator and the water discharging from the instrument, to be readily observed, the water at substantially the same temperature as the water in the tank being discharged into the distal end of the bougie or applicator and inforced to travel back approximately the full length thereof before escaping.

In the modification of the instrument illustrated in Fig. 3, the shell of the bougie or applicator 5 is substantially the same as that shown in Fig. 1, but instead of receiving the cap 6 directly, has applied to its outer threaded end an inwardly-extending tube 19 closely fitting within the outer shell at its extremity and of reduced diameter intermediate its length to form an air jacket 20. The cap 6ª, corresponding to the cap 6, is of substantially the same construction except it is made relatively larger to thread over the tube 19. By reason of the addition of the tube 19 to the bougie, the water passing in through the inner or feed tube reaches the end of the bougie and heats it, and then passes out through the tube 19 without touching the wall of the proximal two-thirds of the outer shell. This makes it possible to apply heat to the rectum, womb, vagina and deep urethra without heating the skin at the entrance, the skin being more sensitive to heat or cold than the mucous membranes. With the instrument at work, the insulated tank may contain water at the temperature desired to be used, the insulation preventing any substantial dissipation of the heat or cold.

Having thus described my invention, I claim as new and desire to secure by Letters Patent:

1. In an instrument for subjecting portions of the human system to heat or cold, a hollow bougie closed at its distal end and having a cap removably applied to its proximal end, the distal end of the bougie of approximately the same diameter as the body of the bougie, a tube extending into the bougie from the proximal end thereof, with the inner end of the tube having a fluid-tight joint with the bougie and spaced therefrom, a feed tube for introducing into the bougie a heating or cooling agent, having a fluid-tight joint with the cap and discharging at the distal end of the bougie and passing through the first-named tube and forming in connection therewith an annular discharge passage, and a discharge tube leading from the said discharge passage and having a fluid-tight joint with the cap.

2. In an instrument for subjecting portions of the human system to heat or cold, a hollow bougie closed at its distal end and having a screw-threaded cap removably applied to its proximal end, the distal end of the bougie of substantially the same diameter as the body of the bougie and curving to one side, a liquid supply tube extending substantially centrally into the bougie, discharging at the distal end thereof and having a fluid-tight joint with the cap, and a discharge tube having a fluid-tight joint with the cap at one side of the supply tube.

In testimony whereof I have signed my name to this specification in the presence of two subscribing witnesses.

JACOB A. FULTON.

Witnesses:
G. C. FULTON,
W. M. VAN DUSEN.